UNITED STATES PATENT OFFICE.

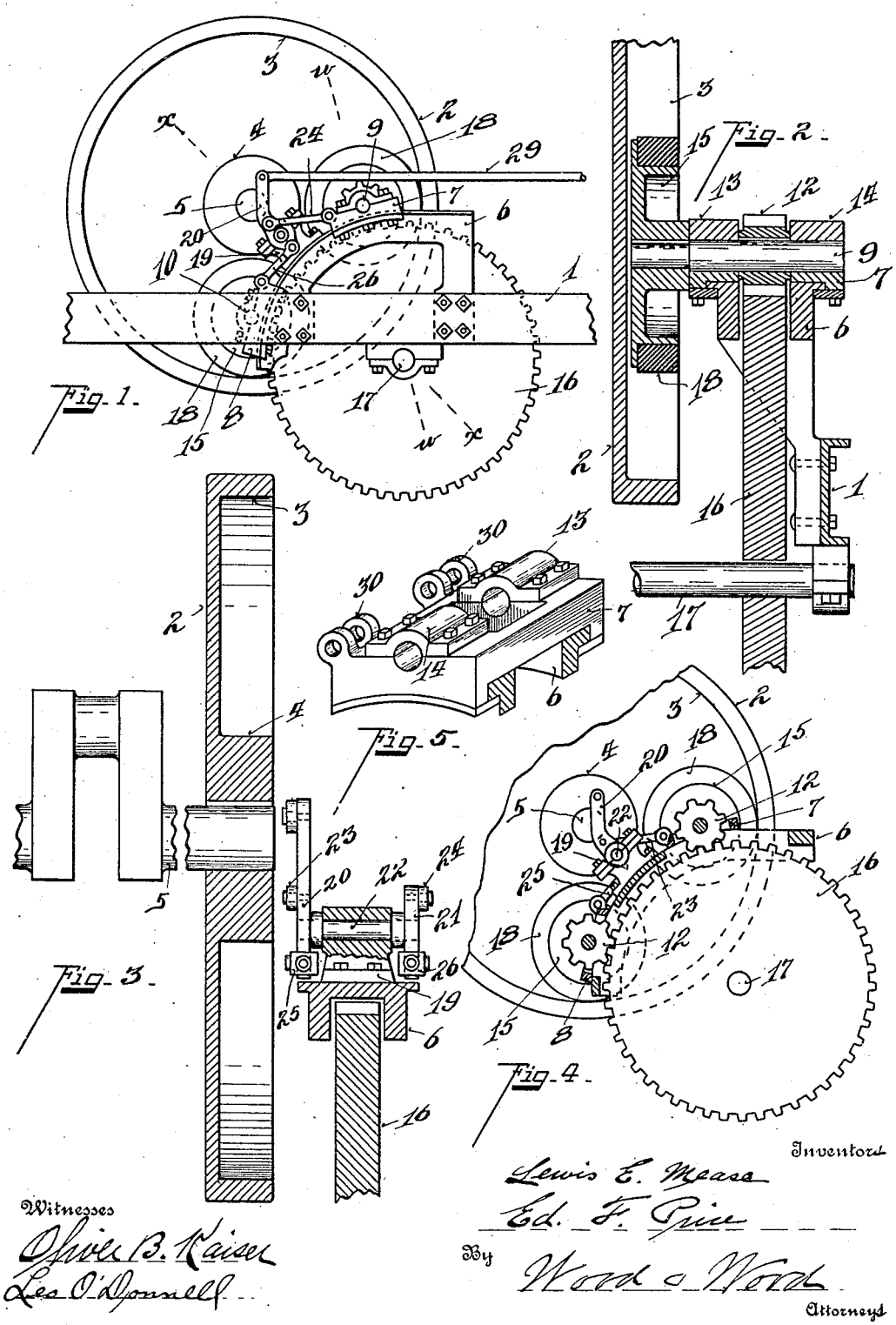

LEWIS E. MEASE AND EDWIN F. PRICE, OF UPPER SANDUSKY, OHIO.

MECHANISM FOR IMPARTING AND REVERSING MOTION.

No. 851,821.　　　　　Specification of Letters Patent.　　　　Patented April 30, 1907.

Application filed December 4, 1906. Serial No. 346,350.

*To all whom it may concern:*

Be it known that we, LEWIS E. MEASE and EDWIN F. PRICE, citizens of the United States, residing at Upper Sandusky, in the county of Wyandot and State of Ohio, have invented certain new and useful Improvements in Mechanism for Imparting and Reversing Motion, of which the following is a specification.

Our invention relates to a friction drive, primarily adapted to be used as a gasolene traction truck, or other similar vehicles.

The object of our invention is to provide a friction drive, wherein the driving element is provided with transmitting surfaces, adapted to be frictionally engaged with friction wheels simultaneously actuated to alternately engage such driving surfaces for transmitting to the driven element different motions at varying speeds.

Another object of our invention relates to means for simultaneously shifting the friction wheels in a given relation with the driven element and driving element upon a permanent support.

The features of our invention are more fully set forth in the description of the accompanying drawings, forming a part of this specification, in which:—

Figure 1 is a side elevation of our invention mounted upon a suitable frame piece. Fig. 2 is a section on line *x, x*, Fig. 1. Fig. 3 is a section on line *w, w*, Fig. 1. Fig. 4 is a sectional elevation of the operative parts shown in Fig. 1, with the shifting lever omitted. Fig. 5 is a perspective view of the slidable boxing supports of one of the transmitting gears.

1 represents a frame piece of an ordinary truck.

2 represents a fly-wheel having an annulus upon one side thereof, forming a projecting rim 3 and a hub 4. This fly-wheel is mounted on the shaft of an ordinary gas-engine in the usual manner. 5 represents a crank shaft by which said fly-wheel is driven by an ordinary connecting rod of a gasolene engine.

6 represents a segmental frame forming a track rigidly secured to the frame piece 1. 7, 8, represent segmental boxes having a concave base fitting and sliding upon said segmental track. 9, 10, represent respectively shafts journaled in the bearings formed in said boxes. The boxes 7, 8, and their attachments and parts are a duplicate each of the other, and a description of one will suffice for both.

12 represents a gear fixed on shaft 9 and between the journal caps 13, 14. Upon the inner end of said shaft 9 is mounted and fixed a friction wheel 15, (see Fig. 2).

16 represents a transmitting gear mounted upon a suitable driver shaft 17, which transmits motion to the truck or vehicle.

The relative position of the gear 12 and the friction wheel 15 are shown in Fig. 2. The friction wheel is shown as having the ordinary paper rim 18.

The corresponding parts of the segmental boxes 8 are mounted in the same manner as shown for the box 7.

It is essential that the two friction wheels 15 shall simultaneously be in frictional engagement with the rim 3 or hub 4.

As shown in Fig. 1, the friction wheels 15 are in frictional engagement with the overhanging rim 3, and are held in that position by the following instrumentalities:—(see Fig. 3.) 19 represents a bracket rigidly fixed to the segmental frame track 6. 20, 21, represent levers fixed to the stud shaft 22. 23, 24, 25, 26, represent links pivotally connected at one end to said levers 20, 21, and at their opposite ends hinged to the segmental boxings 7, 8, by means of ears 30. 29 represents a shifting rod pivoted to the free end of lever 20. Ordinary means are employed for locking said shifting rod in fixed positions so that the levers and links control and hold the friction wheels 15 in firm contact with the driving rim 3 of the fly-wheel. It will be observed that said traveling boxes are attached to opposite sides of the center of levers 20, 21, at equi-distant points, so that said segmental boxes 7, 8, move in opposite directions and travel the same distance at each thrust of the shipping lever. When the shifting rod is pushed inward toward the center of the fly-wheel the boxes 7, 8, are moved away from each other until the peripheries of the friction wheels 15 come in contact with the hub 4, thus reversing the motion of the gears 12, likewise changing the speed of gear 16.

The arrangement of the parts and the driving mechanism are such that when the friction wheels 15 are in contact with the rim 3 of the fly-wheel, the truck or vehicle is propelled forward at a higher speed than that of the reverse backward motion when the power is taken from the hub of the fly-wheel.

By the means herein shown and described we are enabled to employ simultaneously two friction wheels which simultaneously impart motion to the main driving gear of a vehicle. This double friction drive is especially advantageous for propelling heavy loaded trucks or wagons. It enables the starting of the same readily, and materially lessening the liability of slipping, also materially lessening the wear of the frictional surfaces.

Having described our invention, we claim:—

1. In a transmission mechanism, a frame, having a segmental track, a main transmitting gear, a fly-wheel having a projecting rim and hub, a pair of boxes slidable upon said segmental track, friction wheels, a transmitting gear mounted upon each of said slidable boxes, compound link and lever attachments, and a shifting rod connected thereto for simultaneously moving said friction wheels into engagement alternately with the rim and hub of said fly-wheel, substantially as described.

2. A frictional driving gear employing a fly-wheel, having a projecting rim and hub on one side, a pair of frictional drive-wheels, a pair of slidable boxes, a segmental track upon which said boxes are mounted, friction drive and primary gear transmitters respectively mounted upon each box, a main transmitting gear receiving motion simultaneously from the primary gears, and shifting rod and link connections with the respective slidable boxes for simultaneously moving them in opposite directions, substantially as described.

3. A power transmitter for a vehicle, employing a fly-wheel having a projecting rim and hub, a segmental track supported on the vehicle frame, a main transmitter journaled upon the vehicle frame, a pair of slidable boxes mounted upon the segmental track, a primary gear and a friction wheel for each box, said primary gears being simultaneously in mesh with the main gear, and means for simultaneously moving said boxes on the arc of a circle described by the radius of the main gear to and from each other, substantially as described.

4. In a machine of the class described, a main driving wheel, a segmental track, a main driving gear, a slidable box mounted upon said inclined track, a friction transmitter and a gear transmitter mounted upon said slidable box, and means for moving the same on said track on the arc of a circle described by the radius of said main gear, substantially as described.

5. In a machine of the class described, a segmental track, a main friction driving wheel, a slidable box mounted upon said inclined track, a primary friction transmitter and a secondary transmitter journaled upon said sliding box, transmission mechanism in driven connection with said secondary transmitter and means for moving said box to engage and disengage the said main friction driving wheel, substantially as described.

6. In a machine of the class described, a main friction driving wheel, and a segmental track, a pair of slidable boxes mounted upon said inclined track, a primary and a secondary transmitter journaled upon each of said slidable boxes, transmission mechanism in driven connection with said secondary transmitter and means for moving the same to and from each other to simultaneously engage and disengage the primary friction transmitters for controlling the work of said main frictional driving wheel, substantially as described.

7. In a power transmitting device, a main driving wheel, provided with transmission surfaces, a driven wheel, intermediate transmission mechanism, adapted to selectively frictionally engage one of said transmission surfaces of the main driving wheel, means for slidably supporting said intermediate transmission mechanism in an arc described by the radius of the driven wheel, whereby the said transmission mechanism is in constant driving relation with the driven wheel, and in a selected position of rest or engagement with the main driving wheel, substantially as described.

8. In a power transmitting device, a main driving wheel provided with transmission surfaces, a driven wheel, two sets of intermediate transmission mechanisms, adapted to selectively frictionally engage one of said transmission surfaces of the main driving wheel, means for slidably supporting said intermediate transmission mechanisms, whereby said transmission mechanisms are in constant driven relation with the driven wheel, and in a selected position of rest or engagement with the main driving wheel, and means for simultaneously shifting said intermediate transmission mechanisms, substantially as described.

In testimony whereof, we have hereunto set our hands.

LEWIS E. MEASE.
ED. F. PRICE.

Witnesses:
L. M. BOWERS,
THOS. C. KERR.